(12) United States Patent
McCloskey et al.

(10) Patent No.: US 6,252,035 B1
(45) Date of Patent: Jun. 26, 2001

(54) SALTS OF CHELATING AGENTS AS POLYMERIZATION CATALYSTS

(75) Inventors: Patrick Joseph McCloskey, Watervliet; Timothy Brydon Burnell, Niskayuna; Paul Michael Smigelski, Jr., Schenectady, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/451,033

(22) Filed: Nov. 29, 1999

(51) Int. Cl.$^7$ .................................................. C08G 64/00
(52) U.S. Cl. ............................................. 528/196; 528/198
(58) Field of Search ...................... 528/196, 198

(56) References Cited

U.S. PATENT DOCUMENTS 5,494,992  2/1996  Kanno et al. ..................... 528/196

FOREIGN PATENT DOCUMENTS

584801A2  3/1994  (EP) .
726285A2  8/1996  (EP) .
753704    2/1995  (JP) .

OTHER PUBLICATIONS

McCloskey et al., "Salts of Arylsulfonic Acids as Polymerization Catalysts", S.N. 09/546,597, filed Apr. 10, 2000.
McCloskey et al., "Salts of Non–Volatile Acids as Polymerization Catalysts", S.N. 09/497,398, filed on Feb. 4, 2000.
McCloskey et al., "Alkali Metal Salts of Oxoacids of Sulfur as Polymerization Catalysts", S.N. 09/411,274, filed on Oct. 4, 1999.
Japanese Abstract, Database Chemabs 'Online', Database Accession No. 124:147202/DN (Jap. Patent No. 07247351.
Japanese Abstract, Database Chemabs 'Online', Database Accession No. 125:59434–DN (Jap. Patent No. 08081550.
International Search Report.

*Primary Examiner*—Terressa M. Boykin
(74) *Attorney, Agent, or Firm*—Noreen C. Johnson; Douglas E. Stoner

(57) ABSTRACT

The present invention relates to a method for the preparation of polycarbonate comprising preparing a polycarbonate by a melt process by reacting a diphenol and a diaryl carbonate in the presence of a catalytically effective amount of one or more alkali and or alkali earth metal salts of chelating agents. Suitable chelating agents include nitrilotriacetate and EDTA.

22 Claims, No Drawings

SALTS OF CHELATING AGENTS AS POLYMERIZATION CATALYSTS

FIELD OF THE INVENTION

This invention relates to salts of chelating agents useful as catalysts in melt polymerizations. Suitable salts of chelating agents include alkali and/or alkali earth metal salts of ethylenediamine tetraacetic acid; alkali and/or alkali earth metal salts of nitrilotriacetate; and mixtures thereof. The invention further relates to polycarbonates prepared using the alkali and/or alkali earth metal salts of these chelating agents, and articles made from these polycarbonates.

BACKGROUND OF THE INVENTION

Conventional industrial plants synthesize polycarbonate by mixing together an aqueous solution of dihydric compound (e.g., bisphenol-A) with an organic solvent (e.g., dichloromethane) containing a carbonyl halide (e.g., phosgene) Upon mixing the immiscible organic and aqueous phases, the dihydric compound reacts with the carbonyl halide at the phase interface. Typically, a phase transfer catalyst, such as a tertiary amine, is added to the aqueous phase to enhance this reaction. This synthesis method is commonly known as the "interfacial" synthesis method for preparing polycarbonate.

The interfacial method for making polycarbonate has several inherent disadvantages. First it is a disadvantage to operate a process which requires phosgene as a reactant due to obvious safety concerns. Second it is a disadvantage to operate a process which requires using large amounts of an organic solvent because expensive precautions must be taken to guard against any adverse environmental impact. Third, the interfacial method requires a relatively large amount of equipment and capital investment. Fourth, the polycarbonate produced by the interfacial process is prone to having inconsistent color, higher levels of particulates, and higher chlorine content, which can cause corrosion.

Some new commercial polycarbonate plants synthesize polycarbonate by a transesterification reaction whereby a diester of carbonic acid (e.g., diphenylcarbonate) is condensed with a dihydric compound (e.g., bisphenol-A). This reaction is performed without a solvent, and is driven to completion by mixing the reactants under reduced pressure and high temperature with simultaneous distillation of the phenol produced by the reaction. This synthesis technique is commonly referred to as the "melt" technique. The melt technique is superior over the interfacial technique because it does not employ phosgene, it does not require a solvent, and it uses less equipment. Moreover, the polycarbonate produced by the melt process does not contain chlorine contamination from the reactants, has lower particulate levels, and has a more consistent color. Therefore it is highly desirable to use the melt technique in a commercial manufacturing process.

In the production of polycarbonates by the melt polymerization process, alkali metal hydroxides, in particular sodium hydroxide, are used as polymerization catalysts. While alkali metal hydroxides are useful polymerization catalysts, they also effect side reactions which results in branched side reaction products. This causes changes in the melt behavior of the polycarbonate, which can lead to difficulties in processing.

It would be desirable, therefore, to develop a catalysts system which effects melt polymerization while minimizing undesirable reaction products, such as branched side reaction products.

DESCRIPTION OF THE INVENTION

The present invention addresses these concerns and provided further surprising properties.

The present invention may be understood more readily by reference to the following detailed description of preferred embodiments of the invention and the examples included therein.

Before the present compositions of matter and methods are disclosed and described, it is to be understood that this invention is not limited to specific synthetic methods or to particular formulations, as such may, of course, vary. It is also to be understood that the terminology used herein is for the purpose of describing particular embodiments only and is not intended to be limiting.

In the following specification, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the term "melt polycarbonate" refers to a polycarbonate made by the transesterification of a carbonate diester with a dihydroxy compound.

"BPA" is herein defined as bisphenol A or 2,2-bis(4-hydroxyphenyl)propane.

The terms "diphenol" and "dihydric phenol" as used herein are synonymous.

In the present invention, it was unexpectedly found that the use of salts of chelating agents as polymerization catalysts, including salts of ethylendiamine tetraacetic acid (EDTA) and salts of nitrilotriacetate, reduces side reaction products. These side reaction products include "Fries" product and other branched side reaction products The reduction of these products provides the advantages of increased ductility, and prevents the reduction of rheological properties which results when undesirable side reaction products, such as Fries product, are present. It was further unexpectedly found that for a given set of conditions, the catalyts as described in the present invention produced less Fries than alkali metal hydroxides, such as sodium hydroxide.

Specifically, the present invention provides a catalyst system for the production of polycarbonate by the melt process, wherein the polycarbonate has a reduced content of undesirable branched side reaction product, in particular Fries products. In particular, it is desirable to have Fries product of less than 1000 ppm, preferably less than 900 ppm, more preferably less than 500 ppm, even more preferably less than 200 ppm.

Polycarbonate produced by the melt process typically has higher Fries content than polycarbonates produced by the interfacial method. As used herein the term "Fries" or "fries" refers to a repeating unit in polycarbonate having the following formula (I):

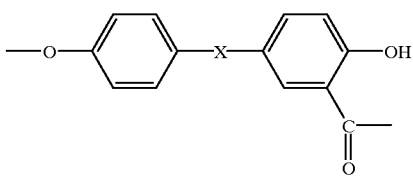

where the X variable represents

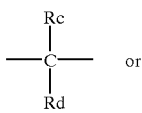

Variable $R_c$ and $R_d$ each independently represent a hydrogen atom or $R_e$ a monovalent hydrocarbon group and may form a ring structure. Variables $R_e$ is a divalent hydrocarbon group.

It is very desirable to have a low Fries content in the polycarbonate product, as Fries products reduce the performance characteristics of the polycarbonate, such as the ductility. Higher Fries contents results in lower ductility. Preparing polycarbonate by the melt process results in the formation of Fries products.

The present invention relates to melt polymerization catalysts in a melt polymerization system in which a dihydric phenol and a diester of carbonic acid are reacted. Dihydric phenols which are useful in preparing the polycarbonate of the invention may be represented by the general formula

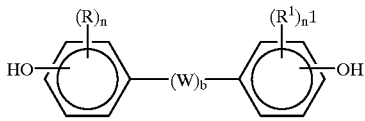

wherein:
R is independently selected from halogen, monovalent hydrocarbon, and monovalent hydrocarbonoxy radicals;
$R^1$ is independently selected from halogen, monovalent hydrocarbon, and monovalent hydrocarbonoxy radicals:
W is selected from divalent hydrocarbon radicals,

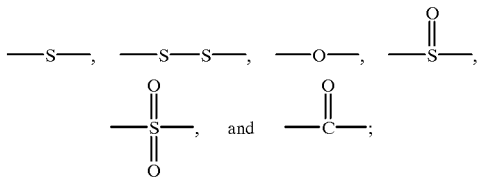

n and $n^1$ are independently selected from integers having a value of from 0 to 4 inclusive; and
b is either zero or one.

The monovalent hydrocarbon radicals represented by R and $R^1$ include the alkyl, cycloalkyl, aryl, aralkyl and alkaryl radicals. The preferred alkyl radicals are those containing from 1 to about 12 carbon atoms. The preferred cycloalkyl radicals are those containing from 4 to about 8 ring carbon atoms. The preferred aryl radicals are those containing from 6 to 12 ring carbon atoms, i.e., phenyl, naphthyl, and biphenyl. The preferred alkaryl and aralkyl radicals are those containing from 7 to about 14 carbon atoms.

The preferred halogen radicals represented by R and $R^1$ are chlorine and bromine.

The divalent hydrocarbon radicals represented by include the alkylene, alkylidene, cycloalkylene and cycloalkylidene radicals. The preferred alkylene radicals are those containing from 2 to about 30 carbon atoms. The preferred alkylidene radicals are those containing from 1 to about 30 carbon atoms. The preferred cycloalkylene and cycloalkylidene radicals are those containing from 6 to about 16 ring carbon atoms.

The monovalent hydrocarbonoxy radicals represented by R and $R^1$ may be represented by the formula —$OR^2$ wherein $R^2$ is a monovalent hydrocarbon radical of the type described hereinafore. Preferred monovalent hydrocarbonoxy radicals are the alkoxy and aryloxy radicals.

Suitable dihydric phenols include, but are not limited to, BPA; 2,2-bis(3,5-dibromo-4-hydroxyphenyl)propane; 2,2-bis(3,5-dimethyl-4-hydroxyphenyl)propane; 1,1-bis(4-hydroxyphenyl)cyclohexane; 1,1-bis(3,5-dimethyl-4-hydroxyphenyl)cyclohexane; 1,1-bis(4-hydroxyphenyl) decane; 1,1-bis(4-hydroxyphenyl)propane; 1,1-bis(4-hydroxyphenyl)cyclodecane; 1,1-bis(3,5-dimethyl-4-hydroxyphenyl)cyclododecane; 4,4-dihydroxyphenyl ether; 4,4-thiodiphenol; 4-4-dihydroxy-3,3-dichlorodiphenyl ether; 4,4-thiodiphenol; 4,4-dihydroxy-3,3-dichlorodiphenyl ether; 4,4-dihydroxy-2,5-dihydroxydiphenyl ether; BPI; 1,1-bis(4-hydroxyphenyl)-1-phenylethane; 1,1-bis(3-methyl-4-hydroxyphenyl)-1-phenylethane, and mixtures thereof. In one embodiment, the residues of dihydric phenol in the polycarbonate comprise 100 mol % of residues derived from BPA.

Optionally, polyfunctional compounds may be utilized. Suitable polyfunctional compounds used in the polymerization of branched polycarbonate include, but are not limited to,
1,1,1-tris(4-hydroxyphenyl)ethane,
trimellitic anhydride,
trimellitic acid, or their acid chloride derivatives.

As the diester of carbonic acid, various compounds may be used, including, but not limited to diaryl carbonate compounds, dialkyl carbonate compounds and alkylaryl carbonate compounds. Suitable diesters of carbonic acid include, but are not limited to, diphenyl carbonate; bis(4-t-butylphenyl)carbonate; bis(2,4-dichlorophenyl)carbonate; bis(2,4,6-trichlorphenyl)carbonate; bis(2-cyanophenyl)carbonate; bis(o-nitrophenyl)carbonate; ditolyl carbonate; m-cresol carbonate; dinaphthyl carbonate; bis(diphenyl)carbonate; diethylcarbonate; dimethyl carbonate; dibutyl carbonate; dicyclohexyl carbonate; and mixtures thereof. Of these, diphenyl carbonate is preferred. If two or more of these compound are utilized, it is preferable that one is diphenyl carbonate.

In the process of the present invention, an endcapping agent may optionally be used. Suitable endcapping agents include monovalent aromatic hydroxy compounds, haloformate derivatives of monovalent aromatic hydroxy compounds, monovalent carboxylic acids, halide derivatives of monovalent carboxylic acids, and mixtures thereof.

Suitable endcapping agents include, but are not limited to phenol, p-tert-butylphenol; p-cumylphenol; p-cumylphenolcarbonate; undecanoic acid, lauric acid, stearic acid; phenyl chloroformate, t-butyl phenyl chloroformate, p-cumyl chloroformate, chroman chloroformate, octyl phenyl: nonyl phenyl chloroformate or a mixture thereof.

If present, the endcapping agent is preferably present in amounts of about 0.01 to about 0.20 moles, preferably about 0.02 to about 0.15 moles, even more preferably about 0.02 to about 0.10 moles per 1 mole of the dihydric phenol.

In the process of the present invention, the catalyst system comprises at least one alkali and/or alkali earth metal salt of ethylenediamine tetraacetic acid, nitrilotriacetate, or a mixture thereof. "Catalyst system" as used herein refers to the catalyst or catalysts that catalyze the transesterification of the dihydric phenol and the carbonic acid diester in the melt process.

Alkali and/or alkali earth metal salts of ethylene diamine tetraacetic acid and alkali and/or alkali earth metal salts of nitrilotriacetate which are suitable as melt polymerization catalysts include, but are not limited to, sodium EDTA; disodium EDTA; tetrasodium EDTA; dilithium EDTA; cesium EDTA; disodium magnesium EDTA; disodium calcium EDTA; monosodium nitrilotriacetate; disodium nitrolotriacetate; or a mixture thereof; more preferably disodium EDTA; tetrasodium EDTA; disodium magnesium EDTA or a mixture thereof; even more preferably disodium magnesium EDTA. In a further embodiment, mixtures of alkali borate metal salts with a chelating agent may be used as the catalyst. Suitable mixtures of alkali borate metal salts with chelating agents include, but are not limited to, a mixture of sodium borate and EDTA. It is most preferable that the alkali metal constituent of the chelating agent is sodium for the lowest branching side product formation. In one embodiment, the catalyst system consists of alkali metal salts of EDTA. Optionally, the catalyst system may comprise alkali and/or alkali earth metal salts of the chelating agent and alkali metal hydroxides, such as sodium hydroxide.

The catalyst or catalysts is preferably used in an amount of from $10^{-8}$ to $10^{-3}$ moles of catalyst per 1 mole of dihydric phenol compound, more preferably $10^{-7}$ to $10^{-5}$ moles of catalyst per 1 mole of dihydric phenol compound. When the amount is less than $10^{-8}$ mol, there is the possibility that catalyst activity is not exhibited. When the amount is greater than $10^{-3}$ moles per 1 mole of dihydric phenol, the properties of the final polycarbonate product may be adversely affected.

The catalyst or catalysts may be added in a variety of forms. The catalyst may be added as a solid, for example a powder, or it may be dissolved in a solvent, for example water or alcohol. In one embodiment, the catalyst is added to the reaction system in the form of an aqueous solution. The pH of the aqueous solution is preferably at or near the pH of a freshly prepared solution, which varies depending on the salt of the chelating agent which is used as the catalyst. For example, the pH of an aqueous solution of disodium EDTA is preferably in a range of from about 5 to about 6; while the pH of an aqueous solution of tetrasodium EDTA is preferably in a range of from about 10 to about 11, more preferably from about 10 to about 10.5. Further, the salt of the chelating agent may be formed prior to the introduction of the catalyst into a polymerization system, or the salt may be formed by reaction of the chelating agent with the appropriate compounds in the polymerization system. In the case of catalysts comprising alkali metal borate salts, it is preferable to add the alkali metal borate salts and chelating agents, such as EDTA, as separate components into the reaction system.

If the catalyst is not soluble in water at the desired concentration, the catalyst may optionally be dissolved in a solution comprising a quaternary ammonium salt and/or a phosphonium catalyst. For example, sodium EDTA, dilithium EDTA, and cesium EDTA are insoluble in water at 0.005M and may be dissolved in a solution comprising tetraamethylammonium hydroxide (TMAH). Suitable concentrations of TMAH are from about 0.05M to about 2.2M, preferably about 0.2M.

As the aqueous solution becomes more acidic, the catalyst becomes more selective, however the molecular weight of the resultant product decreases. The desired molecular weight of the product depends on the intended use. For example, for optical materials, the number average molecular weight of the product is preferably in the range of about 7,500 to about 9,000; while for sheet materials the number average molecular weight is preferably in the range of about 25,000 to about 30,000. Therefore, it may be desirable to approach more acidic pHs in the synthesis of polycarbonate materials relatively low molecular weights, for example, optical materials. It is preferable that the pH of the aqueous catalyst solution be maintained above about 2.4.

In addition to the alkali and/or alkali earth metal salt of EDTA, nitrilotriacetate, mixtures thereof, and optionally the alkali metal hydroxide, the catalyst system may optionally comprise a quaternary ammonium salt and/or a phosphonium catalyst. Examples of suitable quaternary ammonium salts include, but are not limited to ammonium hydroxides having alkyl groups, aryl groups and alkaryl groups, such as tetraamethylammonium hydroxide (TMAH) and tetrabutylammonium hydroxide (TBAH). Suitable phosphonium salts include, but are not limited to tetraethylphosphonium hydroxide and tetrabutylphosphonium hydroxide.

If present, the quaternary ammonium salt and/or phosphonium catalyst are preferably present in amounts of from $10^{-2}$ to about $10^{-6}$, preferably $10^{-2}$ to $10^{-5}$ moles per 1 mole of dihydric phenol compound, in addition to the alkali and or alkali earth metal salt of the chelating agent and optionally, the alkali metal hydroxide.

The reaction conditions of the melt polymerization are not particularly limited and may be conducted in a wide range of operating conditions. The reaction temperature is typically in the range of about 100 to about 350° C., more preferably about 180 to about 310° C. The pressure may be at atmospheric, or at an added pressure of from atmospheric to about 15 torr in the initial stages of the reaction, and at a reduced pressure at later stages, for example in the range of about 0.2 to about 15 torr. The reaction time is generally about 1 hours to about 10 hours.

Additives may also be added to the polycarbonate product as long as they do not adversely affect the properties of the product. These additives include a wide range of substances that are conventionally added to the polycarbonates for a variety of purposes. Specific examples include heat stabilizers, epoxy compounds, ultraviolet absorbers, mold release agents, colorants, antistatic agents, slipping agents, anti-blocking agents, lubricants, antifogging agents, natural oils, synthetic oils, waxes, organic fillers, flame retardants, inorganic fillers and any other commonly known class of additives.

The reaction can be conducted as a batch or a continuous process. Any desired apparatus can be used for the reaction. The material and the structure of the reactor used in the present invention is not particularly limited as long as the reactor has an ordinary capability of stirring. It is preferable that the reactor is capable of stirring in high viscosity conditions as the viscosity of the reaction system is increased in later stages of the reaction.

As an additional advantage, unlike the strongly alkaline alkali earth metal hydroxides, such as sodium hydroxide, the catalyts of the present invention are mildly acidic to only slightly basic. As a result, the addition of a catalyst quenching agent is not necessary, but may be added optionally. Typical catalyst quenching agents used with sodium hydroxide include, but are not limited to, strong sulfur or phosphorous acids. Strong acids hurt hydrolytic stability.

The polycarbonate obtained in accordance with the present invention may be used after being mixed with conventional additives, such as plasticizers, pigments, lubricants, mold release agents, stabilizers and organic fillers.

It is also possible to blend the polycarbonate with other polymers, including but not limited to, polyolefins, polystyrenes, polysulfonates, polyamides and polyphenylene ethers.

EXAMPLES

The following examples are set forth to provide those of ordinary skill in the are with a complete description of how the compositions of matter and methods claimed herein are made and evaluated, and are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in ° C.

Molecular weights are reported as number average ($M_n$) and were determined by GPC analysis of polycarbonate prepared by melt polymerization. Standards of polystyrene were used to construct a universal calibration against which polycarbonate could be measured using the Mark-Houwink equation. The temperature of the columns was 25° C. and the mobile phase was chloroform.

Fries content was measured by the KOH methanolysis of resin and is reported as parts per million (ppm). The content of Fries for each of the melt polycarbonates listed in Table 1 was determined as follows. First, 0.50 grams of polycarbonate was dissolved in 4.0 ml of THF (containing p-terphenyl as internal standard). Next, 3.0 ml of 18% KOH in methanol was added to this solution. The resulting mixture was stirred for two hours at this temperature. Next, 1.0 ml of acetic acid was added, and the mixture was stirred for 5 minutes. Potassium acetate was allowed to crystallize over 1 hour. The solid was filtered off and the resulting filtrate was analyzed by liquid chromoatograph using p-terphenyl as the internal standard.

The pH as set forth in Table 1 are the pHs for solution of 0.005M in water, with the exception of those catalysts "in TMAH solution" which means that the catalyst was insoluble in water at 0.005M and was dissolved in 0.25M TMAH solution. The catalyst level for each compound listed was $5.0 * 10^{-6}$ moles catalyst/mole BPA, with the exception of tetrasodium EDTA, which was added at a level of $2.5 * 10^{-6}$ moles catalyst/mole BPA.

TABLE 1

| Sample | Catalyst | Formula | pH | $M_n$ | Fries |
|---|---|---|---|---|---|
| 1 | Sodium Hydroxide | NaOH | 11.60 | 8800 | 3200 |
| 2 | Sodium EDTA | NaEDTA | in TMAH solution | 7836 | 848 |
| 3 | Disodium EDTA | Na$_2$EDTA | 5.32 | 8679 | 510 |
| 4 | Tetrasodium EDTA | N$_4$EDTA | 10.35 | 8576 | 1019 |

TABLE 1-continued

| Sample | Catalyst | Formula | pH | $M_n$ | Fries |
|---|---|---|---|---|---|
| 5 | Lithium hydroxide | LiOH | 11.08 | 7757 | 1486 |
| 6 | Dilithium EDTA | Li$_2$EDTA | in TMAH solution | 7479 | 684 |
| 7 | Dipotassium EDTA | K$_2$EDTA | 4.42 | 9574 | 4321 |
| 8 | Cesium EDTA | CsEDTA | in TMAH solution | 7828 | 1405 |
| 9 | Disodium Magnesium EDTA | Na$_2$Mg EDTA | 8.85 | 9500 | 500 |
| 10 | Disodium Calcium EDTA | Na$_2$Ca EDTA | 9.97 | 8102 | 788 |
| 11 | EDTA | EDTA | 5.80 | 1400 | none det. |
| 12 | Na$_2$nitrilotriacetate | | 6.08 | 8600 | 310 |
| 13 | Sodium borate + EDTA | Na$_2$B$_4$O$_7$ + EDTA | | 8330 | 217 |

The following is a description of how the preparation was prepared for sample 1 in Table. The remaining samples were prepared by an otherwise identical procedure using the other catalysts listed in Table 1, except as noted.

Synthesis of Sample 1

The following reactions were carried out in a 1 liter glass batch reactor equipped with a solid nickel helical agitator. The glass reactor surface was passivated by acid washing, rinsing, and subsequently drying overnight at 70° C. and stored covered until use.

The temperature of the reactor was maintained using a fluidized sand bath with a PID controller and measured near the reactor and sand bath interface. The pressure of the reactor was controlled by a nitrogen bleed into the vacuum pump downstream of the distillate collection flasks and measured at higher pressures (760 mm Hg to 40 mm Hg) with a mercury barometer, and at lower pressures (40 mm Hg to 1 mm Hg) with an Edward pirani gauge.

The reactor was charged with 0.6570 mol BPA and 0.7096 mol diphenyl carbonate prior to assembly. The reactor was then assembled, sealed and the atmosphere was exchanged with nitrogen three times. With the final nitrogen exchange, the reactor was brought to about atmospheric pressure and submerged into the fluidized bath which was at 180° C. After five minutes, agitation was begun at 250 rpm. After an additional ten minutes, the reactants were fully melted and a homogeneous mixture was assumed. Tetramethyl ammonium hydroxide (TMAH, $1.32 \times 10^{-4}$ mol) and sodium hydroxide (NaOH, $5.00 \times 10^{-7}$ mol) were added sequentially after being diluted to the proper concentrations (0.220 M TMAH and $5.00 \times 10^{-3}$ M NaOH) with 18 Mohm water. After the final catalyst was added, timing began, and the temperature was ramped to 210° C. in five minutes. Once at temperature, the pressure was reduced to 180 mm Hg and phenol distillate was immediately formed. After 25 minutes, the pressure was again reduced to 100 mm Hg and maintained for 45 minutes.

The temperature was then ramped to 240° C. in five minutes and the pressure was lowered to 15 mm Hg. These conditions were maintained for 45 minutes. The temperature was then ramped to 270° C. in five minutes and the pressure was lowered to 2 mm Hg. These conditions were maintained for 10 minutes. The temperature was then ramped to the final finishing temperature in five minutes and the pressure was reduced to 1.1 mm Hg. The finishing temperature was 310°

C. After 30 minutes, the reactor was removed from the sand bath and the melt was extruded into liquid nitrogen to quench the reaction.

The results in Table 1 clearly illustrate the effectiveness of the salts of EDTA and nitrilotriacetate as melt polymerization catalysts as compared to sodium hydroxide.

This invention has been described in detail with particular reference to preferred embodiments thereof, but it will be understood that variations and modifications can be effected within the spirit and scope of the invention.

What is claimed is:

1. A method for the preparation of polycarbonate by the melt process comprising reacting a diphenol and a diarylcarbonate in the presence of a catalyst system comprising a catalytically effective amount of alkali and/or alkali earth metal salts of EDTA; alkali and/or alkali earth metal salts of nitrilotriacetate; or a mixture thereof.

2. The method of claim 1, wherein the catalyst system comprises sodium EDTA; disodium EDTA; tetrasodium EDTA; dilithium EDTA; dipotassium EDTA; cesium EDTA; disodium magnesium EDTA; disodium calcium EDTA, nitirilotriacetate; disodium nitrilotriacetate or a mixture thereof.

3. The method of claim 1, wherein the catalyst system comprises disodium EDTA; tetrasodium EDTA; disodium magnesium EDTA or a mixture thereof.

4. The method of claim 1, wherein the catalyst system comprises disodium magnesium EDTA.

5. The method of claim 1, wherein the diphenol is bisphenol A.

6. The method of claim 1, wherein the catalyst system further comprises a catalytically effective amount of a tetraalkyl ammonium salt, a tetraalkyl phosphonium salt, or a mixture thereof.

7. The method of claim 1, wherein the catalyst system further comprises a catalytically effective amount of TMAH, TBPH or a mixture thereof.

8. A method of reducing the Fries content of a polycarbonate comprising preparing a polycarbonate by a melt process by reacting a diphenol and a diaryl carbonate in the presence of a catalyst system comprising a catalytically effective amount of one or more alkali and/or alkali earth metal salts of a chelating agent, the chelating agent selected from the group consisting of EDTA and nitrilotriacetate.

9. The method of claim 8, wherein the alkali and/or alkali earth salt of the chelating agent is selected from the group consisting of sodium EDTA; disodium EDTA; tetrasodium EDTA; dilithium EDTA; dipotassium EDTA; cesium EDTA; disodium magnesium EDTA; disodium calcium EDTA, monosodium nitrilotriacetate; disodium nitrilotriacetate and a mixture thereof.

10. The method of claim 9, wherein the catalyst system further comprises a catalytically effective amount of a tetraalkyl ammonium salt, a tetraalkyl phosphonium salt, or a mixture thereof.

11. The method of claim 9, wherein the catalyst system further comprises a catalytically effective amount of TMAH, TBPH or a mixture thereof.

12. A polycarbonate prepared by the method of claim 8.

13. A polycarbonate prepared by the method of claim 1.

14. The method of claim 8, wherein the diphenol is bisphenol A.

15. The method of claim 8, wherein the Fries content of the polycarbonate is less than 1000 ppm.

16. The method of claim 8, wherein the Fries content of the polycarbonate is less than 500 ppm.

17. A method of reducing the branched side products of polycarbonate comprising preparing a polycarbonate by a melt process by reacting a diphenol and a diaryl carbonate in the presence of a catalytically effective amount of one or more alkali and/or alkali earth metal salts of a chelating agent.

18. A method for the preparation of polycarbonate comprising preparing a polycarbonate by a melt process by reacting BPA and diphenyl carbonate in the presence of a catalytically effective amount of disodium magnesium EDTA.

19. A method for the preparation of polycarbonate comprising preparing a polycarbonate by a melt process by reacting BPA and diphenyl carbonate in the presence of a catalytically effective amount of disodium EDTA.

20. A method for the preparation of polycarbonate comprising preparing a polycarbonate by a melt process by reacting BPA and diphenyl carbonate in the presence of a catalytically effective amount of tetrasodium EDTA.

21. A method for the preparation of polycarbonate by the melt process comprising reacting a diphenol and a diarylcarbonate in the presence of a catalyst system comprising a catalytically effective amount of an alkali metal borate salt and a chelating agent.

22. The method of claim 21 wherein the alkali metal borate salt is sodium borate, and the chelating agent is EDTA.

* * * * *